US009147268B2

(12) United States Patent
Chen et al.

(10) Patent No.: US 9,147,268 B2
(45) Date of Patent: Sep. 29, 2015

(54) SUBTRACTION OF PROJECTION DATA IN MEDICAL DIAGNOSTIC IMAGING

(75) Inventors: Mingqing Chen, Iowa City, IA (US); Yefeng Zheng, Dayton, NJ (US); Kerstin Mueller, Erlangen (DE); Christopher Rohkohl, Bochum (DE); Günter Lauritsch, Nürnberg (DE); Jan Boese, Eckental (DE); Gareth Funka-Lea, Cranbury, NJ (US); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 446 days.

(21) Appl. No.: 13/533,314

(22) Filed: Jun. 26, 2012

(65) Prior Publication Data

US 2013/0004052 A1    Jan. 3, 2013

Related U.S. Application Data

(60) Provisional application No. 61/501,948, filed on Jun. 28, 2011.

(51) Int. Cl.
*G06K 9/00* (2006.01)
*G06T 11/00* (2006.01)
*G06T 7/20* (2006.01)

(52) U.S. Cl.
CPC ............ *G06T 11/005* (2013.01); *G06T 7/2046* (2013.01); *G06T 2207/10081* (2013.01); *G06T 2207/30048* (2013.01); *G06T 2211/412* (2013.01)

(58) Field of Classification Search
None
See application file for complete search history.

(56) References Cited

U.S. PATENT DOCUMENTS

| | | | |
|---|---|---|---|
| 5,690,106 A * | 11/1997 | Bani-Hashemi et al. | 600/425 |
| 2005/0251028 A1 * | 11/2005 | Boese et al. | 600/425 |
| 2007/0014452 A1 * | 1/2007 | Suresh et al. | 382/128 |
| 2007/0237038 A1 * | 10/2007 | Li et al. | 369/13.35 |
| 2008/0063250 A1 * | 3/2008 | Ozawa | 382/132 |
| 2008/0064974 A1 * | 3/2008 | Boese et al. | 600/523 |
| 2008/0123928 A1 * | 5/2008 | Harer et al. | 382/131 |
| 2008/0317305 A1 * | 12/2008 | Cover et al. | 382/128 |
| 2009/0074150 A1 * | 3/2009 | Jaffray et al. | 378/197 |
| 2009/0252378 A1 * | 10/2009 | Boese | 382/107 |
| 2009/0279765 A1 * | 11/2009 | Qu et al. | 382/132 |
| 2010/0027861 A1 * | 2/2010 | Shekhar et al. | 382/131 |
| 2010/0114289 A1 * | 5/2010 | Camus et al. | 623/1.11 |
| 2011/0228906 A1 * | 9/2011 | Jaffray et al. | 378/65 |

OTHER PUBLICATIONS

D. Schafer, J. Borgert, V. Rasche, and M. Grass, "Motion-compensated and gated cone beam filtered back-projection for 3D rotational X-ray angiography," IEEE Trans. Medical Imaging, vol. 25, No. 7, pp. 898-906, 2006.

(Continued)

*Primary Examiner* — Nancy Bitar

(57) ABSTRACT

Background information is subtracted from projection data in medical diagnostic imaging. The background is removed using data acquired in a single rotational sweep of a C-arm. The removal may be by masking out a target, leaving the background, in the data as constructed into a volume. For subtraction, the masked background information is projected to a plane and subtracted from the data representing the plane.

16 Claims, 4 Drawing Sheets

(56) References Cited

OTHER PUBLICATIONS

M. Prummer, J. Hornegger, G. Lauritsch, L. Wigstrom, E. Girard-Hughes, and R. Fahrig, "Cardiac C-arm CT: A unified framework for motion estimation and dynamic CT," IEEE Trans. Medical Imaging, vol. 28, No. 11, pp. 1836-1849, 2009.

R. Berbeco, H. Mostafavi, G. Sharp, and S. Jiang, "Towards fluoroscopic respiratory gating for lung tumours without radiopaque markers," Physics in Medicine and Biology, vol. 50, p. 4481, 2005.

Y. Cui, J. Dy, G. Sharp, B. Alexander, and S. Jiang, "Multiple template-based fluoroscopic tracking of lung tumor mass without implanted fiducial markers," Physics in Medicine and Biology, vol. 52, p. 6229, 2007.

M. Moriyama, Y. Sato, H. Naito, M. Hanayama, T. Ueguchi, T. Harada, F. Yoshimoto, and S. Tamura, "Reconstruction of time-varying 3-D left-ventricular shape from multiview X-ray cineangiocardiograms," IEEE Trans. Medical Imaging, vol. 21, No. 7, pp. 773-785, 2002.

L. A. Feldkamp, L. C. Davis, and J. W. Kress, "Practical cone-beam algorithm," Journal of the Optical Society of America A, Optics and Image Science, vol. 1, No. 6, pp. 612-619, 1984.

R. Gordon, R. Bender, and G. Herman, "Algebraic reconstruction techniques (art) for three-dimensional electron microscopy and x-ray photography," Journal of Theoretical Biology, vol. 29, No. 3, pp. 471-481, 1970.

S. Kaczmarz, "Angenaherte auflosung von systemen linearer gleichungen," Bull. Acad. Polon. Sci. Lett. A, vol. 35, pp. 355-357, 1937.

A. H. Andersen and A. C. Kak, "Simultaneous algebraic reconstruction technique (SART): A superior implementation of the ART algorithm," Ultrasonic Imaging, vol. 6, No. 1, pp. 81-94, 1984.

K. Mueller, "Fast and accurate three-dimensional reconstruction from cone-beam projection data using algebraic methods." PhD thesis, The Ohio State University, 1998.

K. Mueller, R. Yagel, and J. Wheller, "Fast implementations of algebraic methods for three-dimensional reconstruction from cone-beam data," IEEE Trans. Medical Imaging, vol. 18, No. 6, pp. 538-548, 1999.

R. Galigekere, K. Wiesent, and D. Holdsworth, "Cone-beam reprojection using projection-matrices," IEEE Trans. Medical Imaging, vol. 22, No. 10, pp. 1202-1214, 2003.

Y. Zheng, A. Barbu, B. Georgescu, M. Scheuering, and D. Comaniciu, "Four-chamber heart modeling and automatic segmentation for 3D cardiac CT volumes using marginal space learning and steerable features," IEEE Trans. Medical Imaging, vol. 27, No. 11, pp. 1668-1681, 2008.

M. Chen, Y. Zheng, K. Mueller, C. Rohkohl, G. Lauritsch, J. Boese, G. Funka-Lea, J. Hornegger, and D. Comaniciu, "Automatic extraction of 3D dynamic left ventricle model from 2D rotational angiocardiogram," in Proc. Int'l Conf. Medical Image Computing and Computer Assisted Intervention, 2011.

Z. Tu, "Probabilistic boosting-tree: Learning discriminative models for classification, recognition, and clustering," in Proc. Int'l Conf. Computer Vision, vol. 2, pp. 1589-1596, 2005.

K. Li, X. Wu, D. Chen, and M. Sonka, "Optimal surface segmentation in volumetric images-a graph-theoretic approach," IEEE Trans. Pattern Anal. Machine Intell., pp. 119-134, 2006.

U.S. Appl. No. 13/346,818, filed Jan. 10, 2012.

* cited by examiner

SUBTRACTION OF PROJECTION DATA IN MEDICAL DIAGNOSTIC IMAGING

RELATED APPLICATIONS

The present patent document claims the benefit of the filing date under 35 U.S.C. §119(e) of Provisional U.S. Patent Application Ser. No. 61/501,951, filed Jun. 28, 2011, which is hereby incorporated by reference.

BACKGROUND

The present embodiments relate to medical diagnostic imaging. In particular, target information is identified by subtraction of background in medical diagnostic imaging.

Many cardiac interventions use real-time angiocardiogram imaging provided with a C-arm system. By rotating an X-ray source and detector on a C-arm, a 3D computed tomography (CT) volume may be reconstructed. Images may be generated from the volume.

A dynamic 3D model, such as a model of the left ventricle (LV), may be generated automatically from a rotational angiocardiogram. The model may be used to quantitatively evaluate cardiac function, such as LV volume, LV ejection fraction (EF) and regional wall motion during an intervention. The model may be used to provide visual guidance during an intervention by overlaying the model onto 2D fluoroscopy. The model may be used to reduce motion artifacts in 3D image reconstruction. The accuracy of the model may be determined by the segmentation of the target, which may be a challenging problem due to the overlapping of many confounding objects. For the LV, the descending aorta, bones, and diaphragm may be present in 2D projections. To improve the segmentation accuracy, the confounding objects may be removed.

Different approaches have been used to remove confounding objects in angiocardiograms. The target object (e.g., the LV) may have a large motion and the confounding objects (e.g., bones) may be static or have a smaller motion (e.g., the descending aorta). If the angulation of the C-arm is fixed (i.e., no translation and no rotation), a difference image is generated by subtracting the average image of adjacent frames in the image sequence. However, rotational motion of the angiocardiogram causes blurring using subtraction by adjacent frames.

Digital subtraction angiography (DSA) is another image enhancement technique. For each cardiac phase, two images are captured, one of the patient without injection of contrast agent and one of the patient with injected contrast agents. DSA is normally applied for a fixed C-arm angulation, but it is possible to apply this technique to rotational angiography. However, the C-arm is swept at least twice for acquiring images responsive to and not responsive to contrast agents. The longer acquisition time requires longer breath-holding by a patient, which may be difficult for a very sick patient, and may incur more radiation dose. Another challenge is synchronizing the C-arm motion and the cardiac motion to minimize the misalignment of the pre-contrast images and contrasted images.

BRIEF SUMMARY

By way of introduction, the preferred embodiments described below include a method, system, instructions, and computer readable media for subtraction of projection data in medical diagnostic imaging. Background information is removed by subtraction. The background is removed using data acquired in a single rotational sweep of a C-arm. The removal may be by masking out a target, leaving the background, in the data as constructed into a volume. For subtraction, the masked background information is projected to a plane and subtracted from the data representing the plane.

In a first aspect, a method is provided for subtraction of re-projection data in medical diagnostic imaging. C-arm x-ray data is acquired in frames representing different projections through a left ventricle of a patient. The frames are acquired at different times. A processor constructs the C-arm x-ray data into volume data representing a volume of the patient. The volume of the patient includes the left ventricle. The processor masks the left ventricle from the volume data. The processor projects the volume data without the left ventricle to one of the planes corresponding to one of the frames. The processor subtracts the projected volume data from the C-arm x-ray data of the one frame. An image of the left ventricle is generated as a function of a result of the subtracting.

In a second aspect, a non-transitory computer readable storage medium has stored therein data representing instructions executable by a programmed processor for subtraction of projection data in medical diagnostic imaging. The storage medium includes instructions for acquiring a sequence of projection data from a single sweep of a C-arm rotating and translating about a patient, identifying background information in the projection data of the sequence, and removing the background information from the projection data of the sequence.

In a third aspect, a system is provided for subtraction of re-projection data in medical diagnostic imaging. A memory is configured to store projection images representing a sequence of two-dimensional regions over time. A processor is configured to reconstruct volume data representing a static three-dimensional region from the projection images of the sequence, reduce values of the volume data for a target in the static three-dimensional region, project the volume data with the reduced values to two-dimensions, and subtract the projection of the volume data from a first of the projection images.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Using subtraction, the background data from a C-arm projection sequence acquired in a single sweep may be removed. In one embodiment, image enhancement is provided for rotational angiocardiogram by the subtraction of re-projected images. Compared to DSA, only a single sweep of the C-arm with no extra non-contrasted acquisition is needed. Multiple sweeps may be used.

In one rotational C-arm (e.g., rotational angiocardiogram) example, the sequence is used to reconstruct a volume. A static 3D volumetric image is reconstructed from the projection images. The target (e.g., the left ventricle) is masked from the volume. To avoid deteriorating the target structure (e.g., the LV) in the following subtraction of re-projected images, the target structure is masked out (e.g., setting the attenuation values inside the target structure to zero in the reconstructed volume). The resulting background information is projected to the planes of the sequence. The projected background is subtracted from the data of the sequence. After masking, the masked-out volume is re-projected to two-dimensions, and the re-projected images are subtracted from the original images. If the background structures are static, the background structures may be almost completely removed from the subtracted images without deteriorating the target structure. In the angiocardiogram example, the subtraction is provided for motion-compensated DynaCT reconstruction.

Figure 1:
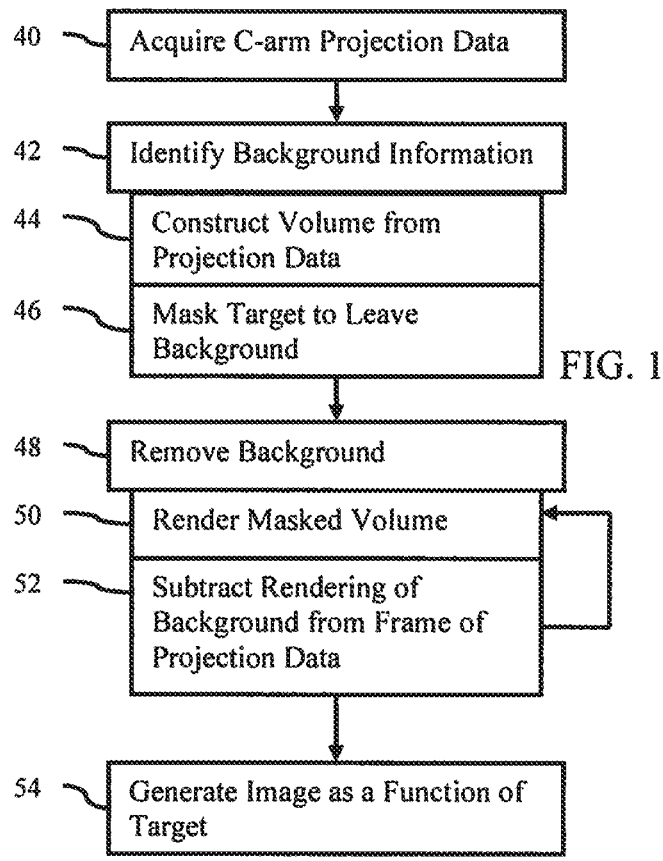
FIG. 1 is a flow chart diagram of one embodiment of a method for subtraction of projection data in medical diagnostic imaging.

FIG. 1 shows a method for subtraction of projection data in medical diagnostic imaging. The background information is removed from data for segmentation or modeling of a target. In one embodiment, the subtraction is for a sequence of data acquired through a single rotational sweep of a C-arm. The x-ray data is projection data. The subtraction is of the projection data. In another embodiment, any C-arm or x-ray scanning may be used. The data is constructed into a volume. The target is masked from the volume. The resulting background is projected to one or more planes. The projection data from the projection from three to two dimensions is subtracted from the data representing a corresponding plane. The removal of background may allow for more accurate segmentation over time, providing motion enhancement in modeling and image generation.

Figure 2:
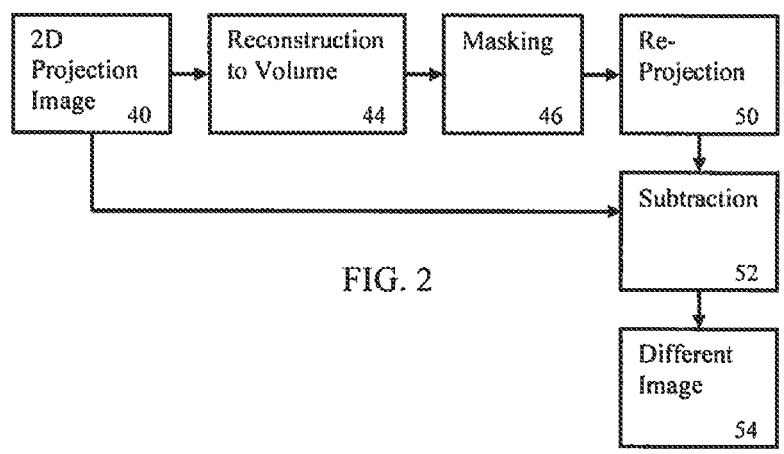
FIG. 2 is a flow chart diagram of another embodiment of the method for subtraction of projection data.

Additional, different, or fewer acts may be performed. For example, acts 42 and/or 48 are not provided. As another example, acts 44, 46, 50, and 52 are not provided. The imaging act 54 may be optional. FIG. 2 represents one embodiment of the method of FIG. 1, but without acts 42 and 48 other than as specifically implemented as parts of acts 44, 46, 50, and 52. FIG. 2 is a workflow for motion enhancement based on re-projection.

Figure 8:
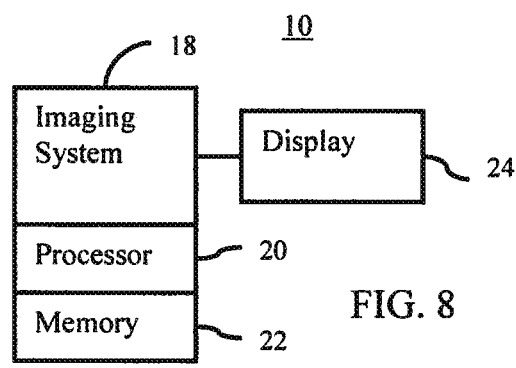
FIG. 8 is a block diagram of one embodiment of a system for subtraction of projection data in medical diagnostic imaging.

The acts of FIGS. 1 and 2 are implemented by the system 10 of FIG. 8 or a different system. For example, an imaging system implements act 40. Alternatively, data is acquired from a memory. A processor implements acts 42-54. The acts are performed in the order shown or a different order.

In act 40, x-ray data, such as C-arm x-ray data, is acquired. The data represents a left ventricle part of the heart, the entire heart, or other portion of the heart of a patient over time. The data may also include information from bones (e.g., ribs and/or spine), diaphragm, other parts of the heart, or other tissue, fluid, or bone. In alternative embodiments, the target is another part of the patient than the left ventricle. Different background information may result due to the different target.

A C-arm holds a detector and x-ray source on different sides of a patient. The C-arm is moved by a gantry in a helical (e.g., translation and rotation) or other pattern (e.g., rotation without translation) about the patient. Any angiocardiogram or other sequences may be used, such as a rotational angiocardiogram. During the movement, the x-ray source emits x-rays detected by the planar detector. Since a given detection represents attenuation along a path from the x-ray source to the detector, the received data is projection data. The projection data is received as a two-dimensional distribution of tissue, bone, fluid, contrast agents or other objects within the patient. By obtaining projections from different positions about the patient, data representing different detection planes spaced around the patient is obtained. The projection data represents attenuation of x-rays through a volume of the patient.

The C-arm x-ray data for the sequence includes a plurality of frames of projection data. Each frame corresponds to data representing a plane. The sequence is of frames. The data of the frames may be in any format, such as image data or attenuation data before generation of an image.

Different from a traditional CT scanner, the gantry's speed in C-arm CT is much slower. In a C-arm angiography scan or sweep, the gantry may take about five to six seconds to rotate 200 degrees around a patient, generating about 133 fluoroscopic images (e.g., projection data). A single sweep is one rotation and/or translation of the x-ray source and detector about the patient in a given direction. If only a single sweep of the C-arm is applied, there are a limited number of projection images available for each cardiac phase (e.g., five). A single C-arm scan is used, but two or more scans or sweeps about the patient may be used. Using a single sweep, a plurality of 2D projection images is received. In one embodiment, the 2D projection images are fluoroscopic images acquired by a C-arm image acquisition system in a single scan.

The C-arm x-ray data is acquired without differences in contrast. Multiple sweeps with the patient having different contrast are not used. For example, a given sweep scans the patient while the patient is free of added contrast agents or scans the patient while added contrast agents are within the field of view of the scanning. The projection data is not acquired for a same location multiple times with a difference in whether there are added contrast agents at the different times.

The frames of data are received over time. The sequence of scans provides C-arm x-ray data representing projection to the different planes at respective times. Different frames may represent a same plane at different times. The different times correspond to a same or different physiological phase (e.g., breathing or heart cycles). For example, the heart cycle is about one second long. A single sweep occurring over 5 seconds may acquire frames of data for different planes and different phases, but some frames from different times may represent a same phase.

The projection images may be received directly from a C-arm image acquisition system. Alternatively, the projection images may be previously acquired images loaded from memory or storage of a computer system.

In act 42, background information is identified in the projection data of the sequence. The background is identified in one or more of the frames of data. The background data is distinguished from data representing the target. For example, data representing bone, the diaphragm, or tissue is identified. The background may be identified by locating data associated with background or data associated with the target (e.g., locating the target also identifies the remaining data as the background).

Any identification may be used. For example, a pattern or template is matched to the projection data. As another example, directional filtering and thresholding identifies the background data from target data. In another example, variance over time indicates the target and lack of variance over time indicates background. In one embodiment, marginal space learning based on steerable or Haar features calculated from the image is applied. The machine trained algorithm distinguishes background from target data based on location, intensity, or both.

The background information is identified in the frames of projection data representing one or more planes. A single frame of data for a given plane is used, or multiple frames representing a same plane may be used, such as through averaging the intensities prior to identification or results after identification.

In another embodiment, the background is identified from a reconstructed volume. In act 44, a volume is constructed from the projection data for identifying the background information. Since the data represents a volume of the patient, the construction from the projection data representing different planes into a volume is a reconstruction. The data is reconstructed to represent a volume rather then different planes. The data is formatted as voxels in a regular, irregular, predetermined, or known three-dimensional grid. The voxels represent the volume of the patient. The C-arm x-ray data is constructed into volume data representing the volume of the patient.

The background may be identified from the volume data. The sequence of projection data is reconstructed. Since the background is relatively stationary compared to the left ventricle, the volume data may be constructed from the projection data representing different phases. The background is, generally, the background in each of the frames. For example, the reconstruction of data representing the left ventricle of the patient from the sequence of frames creates a static volume. The volume may be blurred, such as where motion occurs over time. For the purposes of identifying background, such resolution artifacts may be acceptable. One static volume is constructed from data representing a dynamic or moving object over time, such as different phases of a heart cycle.

Some locations or voxels may be associated with both background and target information. For example, the motion of the target may cause a given voxel to indicate background at one time and target at another. For a static volume, the attenuation or intensity value for the voxel may be a combination of both sources of information. The voxel is either treated as background or as target.

In one embodiment of act 44, a volumetric frame of data is reconstructed. Any reconstruction approach may be used. For example, Feldkamp-Davis-Kress (FDK) reconstruction is used. In another embodiment, an algebraic reconstruction technique (ART) is used. Unlike the FDK algorithm, the ART algorithm explicitly minimizes the mismatch between the re-projected images output in act 50 and the original projections. An X-ray detector panel of a C-arm system may have a limited field of view (FOV). A part of the patient body may be present in some projections but missing in others. As an analytic reconstruction algorithm, the FDK algorithm normally reconstructs the body parts consistently present in the projections and other parts are truncated to zero. To minimize the mismatch of the re-projected images, the FOV of the reconstructed volume includes more tissues. ART is able to reconstruct useful information for those voxels partially outside (e.g. the ribs) the FOV. Though not removed completely, the truncation artifact may be alleviated to some degree.

In ART, the problem of computing the voxel intensities is based on solving a linear algebra equation WV=P, where V is the vector for storing voxels in the reconstructed volume, which contains N voxel elements. P is the vector for storing pixel attenuation values of projection images, which contains M pixel elements. W is the weight matrix, where element $w_{ij}$ represents the weight of voxel j to the pixel i. The linear problem is expanded as, $$\Sigma w_{ij} v_j = p_i \text{ from } j=1 \text{ to } N \quad (1)$$

Since it may be difficult to apply matrix inversion directly to W, an iterative scheme is used. The iterative solution is mathematically represented as:

$$v_j^k = v_j^{k-1} + \lambda[(p_j - \Sigma w_{in} v_n^{k-1})/(\Sigma w_{in}^2)]w_{ij} \text{ from } n=1 \text{ to } N \quad (2)$$

where for each voxel intensity $v_j^k$, the matrix is updated by a correction term from previous iteration $v_j^{k-1}$. The numerator of the correction term is the difference between the original value of pixel $p_i$ and the re-projection, $\Sigma w_{in} v_n^{k-1}$, which which is the line integral along the ray. The difference is scaled by a denominator, which is a summation of the squared weight along the ray, and a relaxation coefficient $\lambda$, which is a value between (0.0, 1.0] to dampen the correction overshoot. The volume is updated iteratively by each ray.

In another embodiment, a simultaneous ART (SART) approach is used. The volume is updated after one entire image is re-projected, as represented by:

$$v_j^k = v_j^{k-1} + \lambda[(\Sigma_{pi \in P_\phi}(p_i - \Sigma_{n=1}^N w_{in} v_n^{k-1})/(\Sigma_{n=1}^N w_{in}))w_{ij}]/ (\Sigma_{pi \in P_\phi} W_{ij}) \quad (3)$$

The correction for voxel j depends on the weighted average of the rays of projection at angle φ that traverse the voxel j. SART may have reduced noise artifact and aliasing artifact as compared to ART. SART is used for image reconstruction in FIGS. 5-7.

Figure 3A:
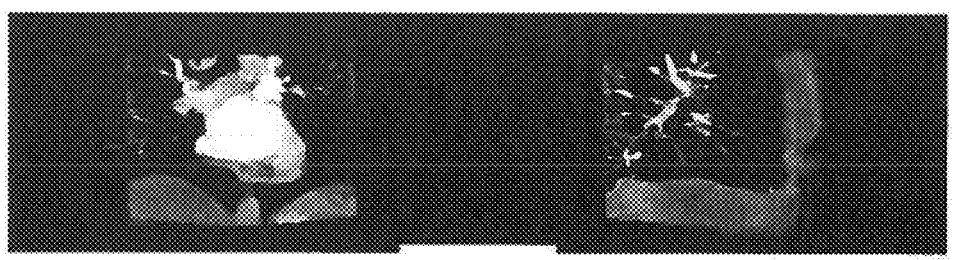
FIGS. 3A and 3B are example medical diagnostic images from different types of volume reconstruction algorithms.
Figure 3B:
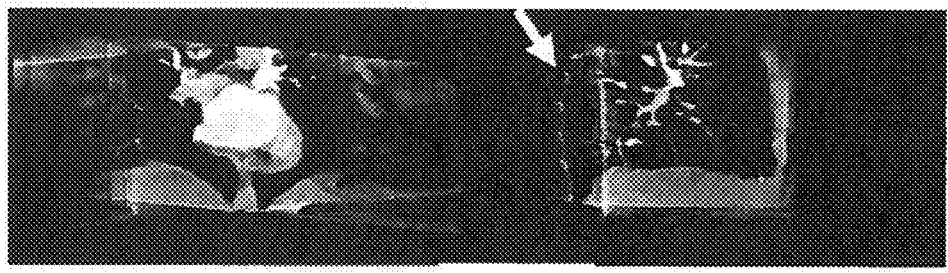

FIG. 3A shows reconstructed C-arm volumes using the FDK reconstruction algorithm. FIG. 3B shows reconstructed C-arm volumes using the SART reconstruction algorithm. The left side of FIGS. 3A and 3B are for a coronal slice reconstructed from the volume. The right side of FIGS. 3A and 3B are for a sagittal slice reconstructed from the volume. SART is able to reconstruct some information outside the field-of-view, such as the ribs indicated by the arrow in FIG. 3B.

In act 46, the voxels or other data are masked. Masking removes the values, such as replacing them with zero values. Alternatively, masking alters values, such as reducing the values. Any function may be used, such as subtracting an average.

Some voxels are masked and other voxels are not. The masking is to remove or reduce a target region or regions and leave background. For example, the data corresponding to the left ventricle is masked out, leaving data associated with other structures. The left ventricle is masked from the volume data or voxels. The voxels enclosed by the endocardium or epicardium of the left ventricle are masked. To avoid deteriorating the left ventricle in the subtracted images, the attenuation values inside the left ventricle are set to zero. The left ventricle blood pool in angiocardiograms corresponds to the left ventricle endocardium.

To mask, the locations (e.g., voxels) associated with the target tissue and/or background are identified or segmented. Any technique for identification may be used. For example, pattern or template matching is used. As another example, filtering and thresholding is used. Any now known or later developed segmentation may be used.

In one embodiment, a machine trained classifier distinguishes between target and background information. For example, the endocardium may be automatically segmented from the volume using marginal space learning. Since a single volume is reconstructed from projections of different cardiac phases, the left ventricle in the volume may be blurred. In general, the left ventricle roughly corresponds to an average size over the whole cardiac cycle in the static volume. A marginal space learning algorithm using any input feature set, such as steerable or Haar wavelet features, may deal with the blurring.

Masking out the region inside the left ventricle endocardium may not be sufficient due to the less defined boundary. Instead, the mask is expanded or sized to more likely remove the left ventricle blood pool information even at the risk of removing some background information. For example, the left ventricle epicardium is segmented from the ungated reconstruction. The left ventricle epicardium may be large enough to enclose the left ventricle blood pool or endocardium across the whole cardiac cycle. The mask is set to mask out voxels enclosed by the left ventricle epicardium. The machine trained classifier is trained to mask out the epicardium and enclosed voxels.

In one embodiment, the mask is binary. Voxels are either masked or not. In other embodiments, the mask includes a transitional zone. A margin is provided where the values (e.g., attenuation) may be reduced, but not by as much. Weights that vary with position within the margin (e.g., by distance away from the blood pool of the left ventricle) are applied as part of the masking. The margin may be within the masking boundary (e.g., epicardium), outside the masking boundary or both within and outside. Masking without a gradual transition may result in a sharp artificial boundary corresponding to the target (e.g., LV epicardium) due to the sudden change of the attenuation values in the masked volume. This artificial boundary may cause problems in later segmentation or detection of the target. To remove this artificial boundary, the outside voxels close to the target-background border (e.g., close to the left ventricle epicardium) are gradually changed to zero using distance transform.

Figure 5A:
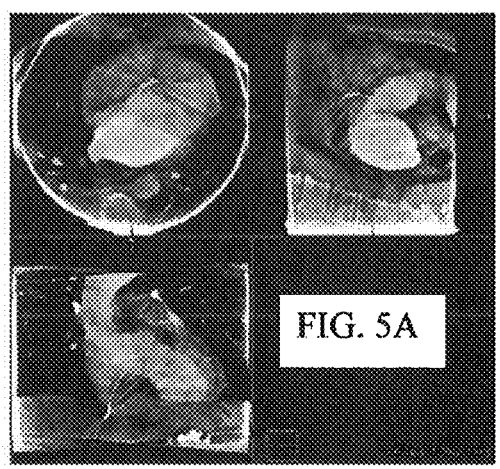
FIGS. 5A and 5B are medical images showing example multi-planar reconstructions of a volume and masked volume, respectively.
Figure 5B:
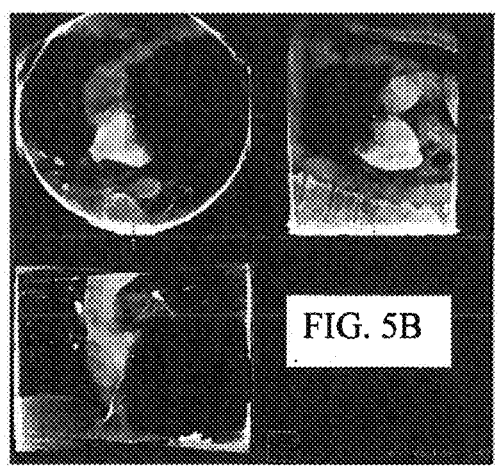
Figure 6A:
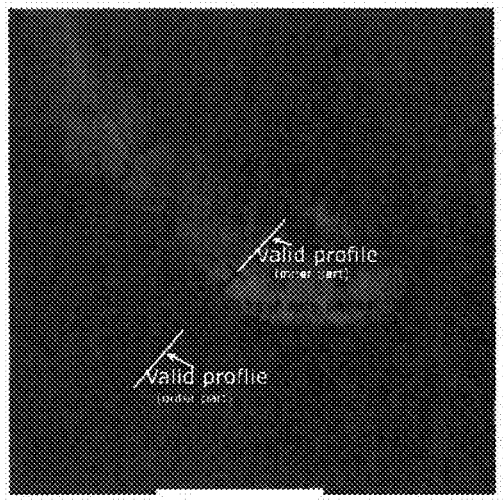
FIGS. 6A and 6B are medical images illustrating left ventricle boundary delineation with and without subtraction of background, respectively.

FIGS. 5A and 5B show example masking of the epicardium in a static volume formed by projection data representing different phases. FIG. 5A shows a multi-planar reconstruction of three orthogonal planes through the left ventricle of a patient. The three images are reconstructed from the volume by interpolation. The images of FIG. 5A are of the volume prior to masking. FIG. 5B shows the volume as masked. The target is set to zero, as represented by the black region shown in the images of FIG. 5B. The edges of the dark region are fuzzy or less defined due to epicardium detection and/or use of a transition.

Referring again to FIG. 1, the background information is removed in act 48. The background is to be removed from the projection data of one or more frames of the sequence acquired in act 40. Where the background information is identified in the frames of the projection data, the background may be removed by subtraction. Where the background information is identified in a reconstructed volume, the background information is projected to the plane or planes represented by the frames from which the background is to be removed. The background identified in the volume format is removed from the two-dimensional imaging using re-projection of the background or masked volume to two-dimensions.

Since the background is relatively static, the removal may use projection of the background from a static volume generated from data representing different phases of a physiological cycle. The projection data is used to form the volume from which background is identified. The masked volume is re-projected back to two-dimensions, providing projection data from the volume to be subtracted from the projection data used to form the volume.

In one example and referring to FIGS. 1 and 2, the masked volume is rendered in act 50. The rendering re-projects the data to one or more planes. The masked voxels are rendered to planes associated with the projection data used to construct the voxels. The voxels projected are of the background without the target (e.g., without the left ventricle). By controlling a viewing direction and/or projection plane relative to the volume, the voxels of the masked volume are rendered to represent a same view as the projection data. The rendering provides re-projected data to the same planes resulting from the scanning for acquiring the original projection data. The re-projected data represents the background without the target for subtraction from the projection data representing both background and target.

Any now known or later developed rendering may be used. For example, surface or projection rendering is used. In one embodiment, FDK, SART or ART is used.

Each iteration of SART reconstruction incorporates re-projection. During the final re-projection step, there is no need to correct the voxel intensities of the volume. A ray integral $\Sigma w_{in} v_n^{k-1}$ from n=1 to N in equation (2) is computed for re-projection.

The accuracy of the ray integral depends on the computation of the weight matrix in equation (1). There are numerous methods to represent the weight function. One simple approach is to resample the ray at equidistant locations and compute the summation of the interpolated value at these locations. Increased sampling rate may provide higher accuracy. Increased sampling rate may lead to higher computational load. In another approach, an overlapping interpolation kernel is used for each voxel to represent the volume. The raster grid of the volume may be represented as a continuous three-dimensional function, $$f(x, y, z) = \sum_{n_x} \sum_{n_y} \sum_{n_z} f(n_x, n_y, n_z) h(x - n_x, y - n_y, z - n_z), \quad (4)$$

where x, y, z is the continuous three-dimensional coordinate, and $n_x, n_y, n_z$ is the discrete location of the volume. Function h is the interpolation kernel of each voxel. The interpolation kernel value is determined by the distance in three coordinates. If the kernel is spherically symmetrical, h may be further simplified as a distance function $h(r)$, where the line integral is only dependent on the distance between the ray and voxel. The advantage of using a kernel representation is that the line integral may be precomputed analytically as $\int h(r(s))$, where s is a three-dimensional vector following the path of the ray in the interpolation kernel. A 1D lookup table (kernel footprint) is established and no computation of the ray integral is needed during re-projection processing. Computation during the re-projection may be used.

Generally, to accurately reconstruct a discretized volume from interpolated positions, the kernel is anti-aliasing. An anti-aliasing kernel may have low amplitude in high frequency. Example kernels include box, linear, Gaussian, and Bessel-Kaiser functions. In one embodiment, a Gaussian kernel with a radius of two voxel spacings is used. The Gaussian kernel has relatively low response in high frequency and may be easier to implement than a Bessel-Kaiser kernel.

The re-projection process is generally categorized into voxel driven re-projection (VDR) and ray driven re-projection (RDR) approaches. For VDR, the computation loops through the voxels in the volume. The footprint of each voxel is mapped to the projection image, and each pixel in the projection image accumulates the overall weight of the projection. RDR, on the other hand, loops through the pixels in a 2D projection image and uses the ray received by each pixel to intersect with volume space. For VDR, since the accumulation of one pixel requires contribution from all the voxels, VDR is used in conjunction with a batch correction algorithm, such as SART. RDR may be implemented by either ART or SART.

Figure 4:
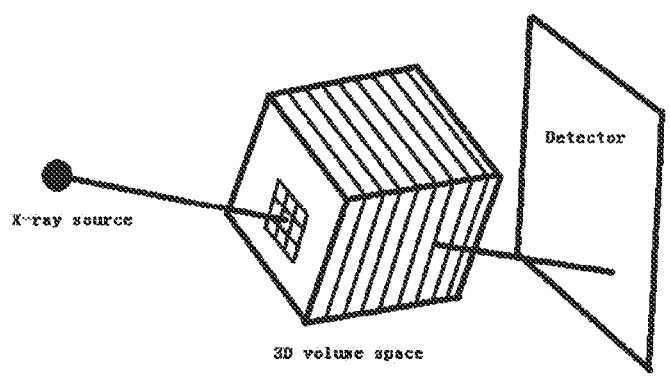
FIG. 4 is an example illustration of a ray for volume rendering.

For perspective projection, such as cone beam CT, RDR may require less computation than VDR due to the high expense of accurate VDR splatting. In one embodiment, the volume is divided into 2D slices formed by planes most perpendicular to the direction of the ray. When a ray is projected from the source and intersects with the volume, the ray intersects with some of those 2D slices as shown in FIG. 4. For each slice, the intersection point is computed and a small region of neighboring voxels is selected. The selected voxels are likely to be within the distance of the kernel radius. Each neighboring voxel is then examined for whether the distance to the ray is smaller than the kernel radius. If true, the footprint is used to find the corresponding ray integral based on the distance. The contributions of all the voxels are accumulated. The neighboring voxels of the intersection in each slice are chosen in a way that no voxel within the distance of the extent of the kernel is occluded. Other approaches may be used.

Ray driven re-projection is based on the C-arm geometry to define the projection planes, represented as a detector plane in FIG. 4. Different from traditional cone beam CT, C-arm CT uses a 4×3 projection matrix P to accurately map the three-dimensional to two-dimensional perspective projection for each angle. The projection matrices are acquired during geometry calibration of the system. For any three-dimensional point $v_3=(x, y, z)^T$ in room coordinates and the corresponding two-dimensional projection location $v_2=(u, v)^T$, the normalized homogeneous coordinate system $v_2^+=(v^T, 1)^T$ represents the perspective projection, where $v_2^+=Pv_3^+$.

The RDR approach may be performed by first representing the equation of a ray passing through the volumetric image by:

$$x(t)=s+dt, \quad (5)$$

where s is the position of the source in room coordinates of a specific angle, d is an $R^3$ direction vector of the ray, which may be normalized, and t is a parameter indicating the distance to the source. The source position may be determined from the projection matrix, represented as:

$$s=-P_3^{-1}p_4, \quad (6)$$

where $P_3$ is the matrix containing the first three columns of P and $p_4$ is the fourth column. The direction vector may be computed from coordinates of projection image [u, v] as:

$$d=-P_3^{-1}p^+, \quad (7)$$

where $p^+=[u, v, 1]^T$.

The entry and exit point of the ray intersected with the volume are identified. The entry and exit points are the intersection points of the ray with volume boundary planes. ζ is denoted as the normal to the plane, and c is denoted as the perpendicular distance from the origin, assuming the six planes are parallel to the coordinate axis. A plane may be represented by:

$$\zeta \cdot x = c, \quad (8)$$

where x is a three-dimensional point on the plane. Incorporating equation (5) into (8), the distance parameter t is derived as, $$t=(c-\zeta \cdot s)/(\zeta \cdot d), \quad (9)$$

under the condition that $\zeta \cdot d \neq 0$ (i.e., the ray and the plane are not parallel). After the intersection points in six planes are derived, the entry point and exit point are found by a boundary check. The intersection of the ray with each slice may be derived by incrementally adding a scaled direction vector to the entry point. Other approaches for defining the projection or detector planes for projection from the volume may be used.

In act 52, the rendered background is subtracted from the projection data. The projection data represents attenuation through a volume to different planes. Each frame of projection data represents a plane. Multiple frames may represent a same plane. The rendered data provides a frame of data representing a plane. Different renderings may be provided to provide frames of data representing different planes. A frame of rendered background data may be provided for all the planes represented by projection data. Alternatively, a frame of rendered background data is provided for only one or a sub-set of all of the planes.

The rendered frames represent the background and not the target. The rendered data may represent part of the target. The projection data represents both the target and background. By subtracting the rendered background data from the projection data, the result is a frame of target data. Due to inaccurate segmentation and/or a transition region, less than all of the background and/or some of the target information may be removed or not removed. The result of the subtraction provides a frame of data generally representing the target with less background information.

Subtraction is performed for one, a sub-set or all frames of projection data. Using the plane represented by any given frame of projection data, the corresponding re-projection of the background is selected. The background data representing the same plane is subtracted from the projection data. In FIG. 1, rendering and subtraction are repeated in a loop for different frames of projection data. Where multiple frames of projection data represent a same plane, such as at different phases or times, the same frame of rendered background may be used for subtraction. The rendering is not repeated. Alternatively, the rendering is repeated. For each different plane, the rendering and subtraction are repeated.

In act 54, an image is generated. The image is generated as a function of a result of the subtraction. The subtraction segments the target, providing one or more frames of data representing the target without the background. For example, the subtraction provides data representing the left ventricle with less or no bone, diaphragm, or other background.

The image is derived from the frame. For example, the data is mapped to gray scale or color values and displayed as a two-dimensional projection image. In the left ventricle example, the displayed image represents the left ventricle of the patient. The image is a function of the removal of the background information. In another approach, the frames of data for different planes are reconstructed into a volume and an image of the target is rendered as an image from three-dimensions. The image is rendered from a volume, such as using projection or surface rendering. The image is a three-dimensional rendering of a volume to a two-dimensional display from a viewing direction. Rather than volume rendering, a multiplanar reconstruction may be generated from the target volume. For example, the image is part of a multiplanar reconstruction showing standard (e.g., A4C, A2C . . . ) views of the heart. Any imaging may be used.

In yet another approach, the data representing the target is used for determining motion or position over time. The motion or position over time is used for reconstruction or modeling. For example, the subtraction segments the blood pool of the left ventricle. A three-dimensional dynamic left ventricle model is extracted based on the segmenting. The C-arm x-ray projection data from different phases is reconstructed while accounting for the motion of the endocardium. Using the motion of the endocardium, images with less blurring but more rapid acquisition (e.g., single sweep) may be generated. The detection disclosed in U.S. Published Patent Application 20120189185 (Ser. No. 13/346,818, filed Jan. 10, 2012) for a Method and System for 3D Cardiac Motion Estimation from Single Scan of C-arm Angiography, the disclosure of which is incorporated herein by reference, may be used. The reconstruction provides data representing locations in a plane or volume.

In another example, the target is used to select or form a model. A representation of the model is displayed. The model may include a temporal aspect, so images of the target are displayed over time.

In yet another example, the displayed image is of text or a graph. For example, the target is used to calculate a value, such as ejection fraction or left ventricle volume. The calculated value is displayed as the image. A graph of the value over time may be displayed as the image.

In one embodiment, the background subtraction improves automatic segmentation accuracy. A machine learning-based left ventricle blood pool detection example is used. The data represents the target after subtraction of the background. During the learning stage, a contour is manually annotated for a given projection image. For each contour point, steerable features are extracted to train a probabilistic boosting tree (PBT) classifier. During the segmentation, the static left ventricle mesh is projected onto a 2D projection image. The silhouette is extracted from this projected mesh and used as initial placement for left ventricle detection. The contour is updated iteratively. During each iteration, the profile is created for each contour point again. For each pixel of the profile, a probability value of this pixel being on the left ventricle boundary is generated by the PBT framework. By using an optimization approach, such as dynamic programming or graph search based surface detection, the contour is updated to a new position, which has maximal summation of probability values under some smoothness constraint.

To quantify the effectiveness of background subtraction on the improvement of segmentation accuracy, the change in the attenuation intensities along the profile of each contour point is determined. The profile is the mesh or detected boundary. Since a larger difference between the two sides of left ventricle boundary and smaller noise leads to a sharper boundary, the contrast-to-noise ratio (CNR) is used to evaluate the background subtraction result. CNR may be expressed as:

$$\text{CNR} = [2(I_{in} - I_{out})] / (\sigma_{in} + \sigma_{out}) \quad (10)$$

where I and σ represent the average and standard deviation of pixels along one part of a profile. The subscripts in and out indicate whether the location is on the inner or outer side of the profile. The width of both inner bands and outer bands is set 30 with a margin of 15. Other values may be used. Higher CNR values indicate sharper the boundaries. Due to the trabeculation of the left ventricle endocardium, even the manually annotated boundary has difficulty to follow the true boundary exactly. A margin is set to determine the inner and outer parts to mitigate the deviation of the true boundary and manual annotation.

Figure 6B:
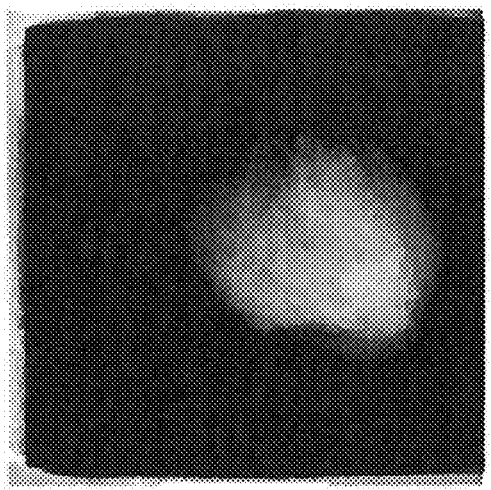
Figure 7A:
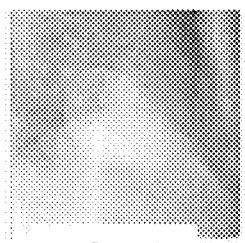
FIGS. 7A-D are medical images showing two examples of before and after subtraction of background.
Figure 7B:
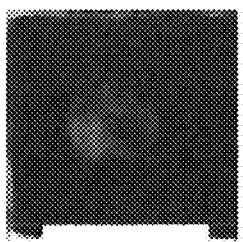
Figure 7C:
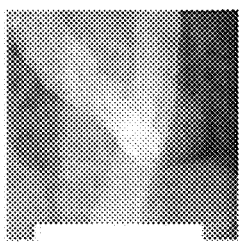
Figure 7D:
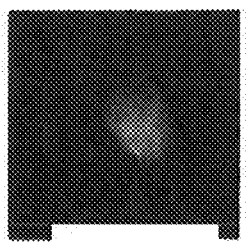

FIG. 5A shows a profile as the boundary of the left ventricle in an attenuation coefficient image without subtraction of the background. FIG. 6B shows the image with subtraction of the background. The left ventricle boundary may be more detectable and have better CNR in the subtraction result of FIG. 6B.

In one example validation, the background subtraction method is quantitatively evaluated on one C-arm scan of a patient, who was injected with contrast agent in the left ventricle. A total of 133 projection images are acquired during the scan. The left ventricle boundary is manually annotated on all the projection data (e.g., for each frame). The average and standard deviation of CNR computed from all the profiles of annotated points are 3.26±2.18 in the original attenuation images, which are improved to 5.89±2.66 after background subtraction. FIGS. 7A-D show some other results of projection before (FIGS. 7A and 7C) and after (FIGS. 7B and 7D) background subtraction. The descending aorta may be completely removed after subtraction.

Other anatomical and/or pathological structures (e.g., the aortic valve or other cardiac chambers) may use the identification and subtraction of background. Other projection geometries than a cone beam projection geometry in a C-arm system may be used. For other projection geometry, the three-dimensional to two-dimensional mapping relationship may be replaced without changing the SART framework.

FIG. 8 shows a system 10 for subtraction of projection data in medical diagnostic imaging. The system 10 implements the method of FIG. 1, the method of FIG. 2, or a different method. The system 10 includes an imaging system 18, a processor 20, a memory 22, and a display 24. Additional, different, or fewer components may be provided. For example, the system 10 includes a user interface.

In one embodiment, the system 10 is a medical diagnostic imaging system. For example, the imaging system 18 is a computed tomography system with a C-arm, x-ray source, and detector as well as the processor 20, memory 22, and display 24. In alternative embodiments, the imaging system 18 is a magnetic resonance, ultrasound, positron emission, photon emission, x-ray, or other imaging system for scanning a patient. In other embodiments, the processor 20 and/or memory 22 are part of a workstation or computer different or separate from the imaging system 18. The workstation is adjacent to or remote from the imaging system 18.

The imaging system 18 causes a scan of an internal region of a patient and generates data representing the region as a function of the scanning. The data used by the processor 20 for subtracting background is at any stage of processing. For example, the data represents attenuation along different lines through the patient. As another example, the data is of a reconstruction into different values for specific locations in a volume.

In another embodiment, the imaging system 18 is a workstation or computer for processing previously acquired data. Data is acquired by transfer from another device or from storage (e.g., PACS system). For example, the data is received from a data archival system or on a network.

The memory 22 is a tape, magnetic, optical, hard drive, RAM, buffer, cache, or other memory. The memory 22 stores the scan data from one or more scans, at different stages of processing, and/or as an image. In one embodiment, the memory 22 stores C-arm x-ray data representing a left ventricle of a patient over at least one heart cycle. For example, the x-ray data is fluoroscopic images or frames of data representing different detector planes at different angles relative to the heart over time. The memory 22 may store data in different stages of processing, such as storing attenuation values, frames of projection data, data representing a volume, frames of projection data rendered from volume reconstruction, background information, target information, or results of subtraction of the background from a frame of projection data. In one embodiment, the memory 22 stores projection images or frames of data representing a sequence of two-dimensional regions over time. The sequence is from a single sweep of a C-arm rotating about a patient.

The memory 22 is additionally or alternatively a non-transitory computer readable storage medium with processing instructions. Data representing instructions executable by the programmed processor 20 is provided for subtraction of projection data in medical diagnostic imaging. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 20 is one or more general processors, digital signal processors, application specific integrated circuits, field programmable gate arrays, controllers, analog circuits, digital circuits, servers, graphics processing units, graphics processors, combinations thereof, network, or other logic devices for reconstructing volume data, identifying a target or background, masking, re-projecting, and subtracting re-projected background from projection data. A single device is used, but parallel or sequential distributed processing may be used. The processor 20 is configured by hardware and/or software to perform the various acts discussed herein.

The processor 20 is configured to reconstruct volume data representing a static three-dimensional region from the projection images of the sequence. Any construction of the volume may be used. The volume data represents attenuation or intensity at different locations distributed through three spatial dimensions. One frame of volume data is used as a static volume for different phases, but different frames may be used for different times.

The processor 20 is configured to reduce values of the volume data for a target. The locations associated with an object of interest are reduced, such as removing or setting to zero. The background or non-target locations remain.

The processor 20 is configured to project the volume data with the reduced values to two-dimensions. The projection emulates the scanning by x-rays, such as cone beam scanning. The plane for rendering is at a same spatial relationship to the volume as the detector used for acquiring the projection data. As the C-arm rotates, the detector plane is at a different position relative to the patient. The rendering emulates this change in position by rendering to different planes for different times. Since the target information is reduced, the rendered data represents mostly or entirely background information. Data for the target is missing from the rendering.

The processor 20 is configured to subtract the projection of the volume data from a projection image. The background data rendered to a plane is subtracted from the projection data with the target and background information. Weighted subtraction may be used such that the background information is reduced but not removed. Equal weighting may be used to more likely remove all of the background. The resulting data may be low pass filtered to remove noise or further remove remaining background information.

The display 24 is a CRT, LCD, projector, plasma, printer, or other display for displaying two-dimensional images or three-dimensional representations or renderings. The display 24 displays fluoroscopy, C-arm x-ray, CT or other images. The images rely on the target information obtained by subtracting the background. For example, a value representing a characteristic of the target, segmented using the results of the subtraction, is displayed. As another example, the frame of data after subtraction is used to generate an x-ray image of the patient. For a C-arm sweep, data representing a plurality of planes is acquired. To reconstruct the planar data into volume data, the location of the different tissue structures, such as the endocardium, is used to determine the spatial relationships over time. The motion or locations at different phases may allow for more accurate reconstruction to a three-dimensional grid from data representing two-dimensional regions at different phases. The reconstructed volume may be rendered to an image, such as with projection or surface rendering.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for subtraction of re-projection data in medical diagnostic imaging, the method comprising:
   acquiring C-arm x-ray data in frames representing a left ventricle of a patient projected to different planes, the frames acquired at different times;
   constructing, with a processor, the C-arm x-ray data into volume data representing a volume of the patient, the volume of the patient including the left ventricle;
   masking, with the processor, the left ventricle from the volume data;
   projecting, with the processor, the volume data without the left ventricle to one of the planes corresponding to one of the frames;
   subtracting, with the processor, the projected volume data from the C-arm x-ray data of the one frame; and
   generating an image of the left ventricle as a function of a result of the subtracting.

2. The method of claim 1 wherein acquiring comprises acquiring the C-arm x-ray data as a rotational angiocardiogram.

3. The method of claim 1 wherein acquiring comprises acquiring with a single sweep of a C-arm and without contrast agent.

4. The method of claim 1 wherein constructing comprises applying an algebraic reconstruction technique.

5. The method of claim 4 wherein applying the algebraic reconstruction technique comprises applying a simultaneous algebraic reconstruction technique.

6. The method of claim 1 wherein constructing comprises constructing the volume data as a static volume from the frames representing different phases of a cardiac cycle.

7. The method of claim 1 wherein masking comprises masking voxels enclosed by an epicardium of the left ventricle.

8. The method of claim 1 wherein masking comprises masking with a marginal space learnt algorithm.

9. The method of claim 1 wherein masking comprises masking with a transitional zone with varying weights as a function of distance away from a blood pool of the left ventricle.

10. The method of claim 1 wherein projecting comprises projecting as a function of an overlapping interpolation kernel.

11. The method of claim 1 wherein projecting comprises ray driven re-projecting based on a C-arm geometry.

12. The method of claim 1 wherein projecting and subtracting are repeated for different planes and corresponding frames.

13. The method of claim 1 wherein generating comprises segmenting a blood pool of the left ventricle based on the result of the subtracting, extracting a three-dimensional dynamic left ventricle model based on the segmenting, and displaying the image representing the model.

14. In a non-transitory computer readable storage medium having stored therein data representing instructions executable by a programmed processor for subtraction of projection data in medical diagnostic imaging, the storage medium comprising instructions for:
   acquiring a sequence of projection data as an angiocardiogram of a left ventricle without contrast agents from a single sweep of a C-arm rotating and translating about a patient;
   identifying background information in the projection data of the sequence, the identifying comprising forming voxels representing a volume from the projection data of the sequence and masking the voxels for a region of interest different than the background information from the volume; projecting the volume data without the left ventricles;
   removing the background information from the projection data of the sequence by rendering the masked voxels to a plane associated with a frame of the projection volume data, and subtracting the rendered voxels of the plane from the projection data of the frame; and generating an image of the left ventricle as a function of a result of the subtracting.

15. The non-transitory computer readable storage medium of claim 14 wherein removing in the volume format comprises removing with a static volume generated from the projection data representing different phases of a physiological cycle.

16. A system for subtraction of re-projection data in medical diagnostic imaging, the system comprising:
   a C-arm configured to rotate from a single sweep of a patient to acquire a sequence of projection data as an angiocardiogram of a left ventricle without contrast agents projected to different planes ;
   a memory configured to store the projection images representing a sequence of two-dimensional regions of the left ventricle over time; and
   a processor configured to reconstruct volume data representing a static three-dimensional region from the projection images of the sequence wherein the volume of the patient includes the left ventricle, mask values of the left ventricle from the volume data for a target in the static three-dimensional region,
   project the volume data with the masked values to two-dimensions corresponding to a first of the projection images without the left ventricles to one of the planes corresponding to one of the frames, subtract the projection of the volume data from the first of the projection images, and generating an image of the left ventricle as a function of a result of the subtracting.

* * * * *